3,043,145
GAS SAMPLE SCANNING APPARATUS
Howard T. Hoffman, Mentor, Ohio, assignor to Bailey Meter Company, a corporation of Delaware
Filed June 10, 1958, Ser. No. 741,159
6 Claims. (Cl. 73—421.5)

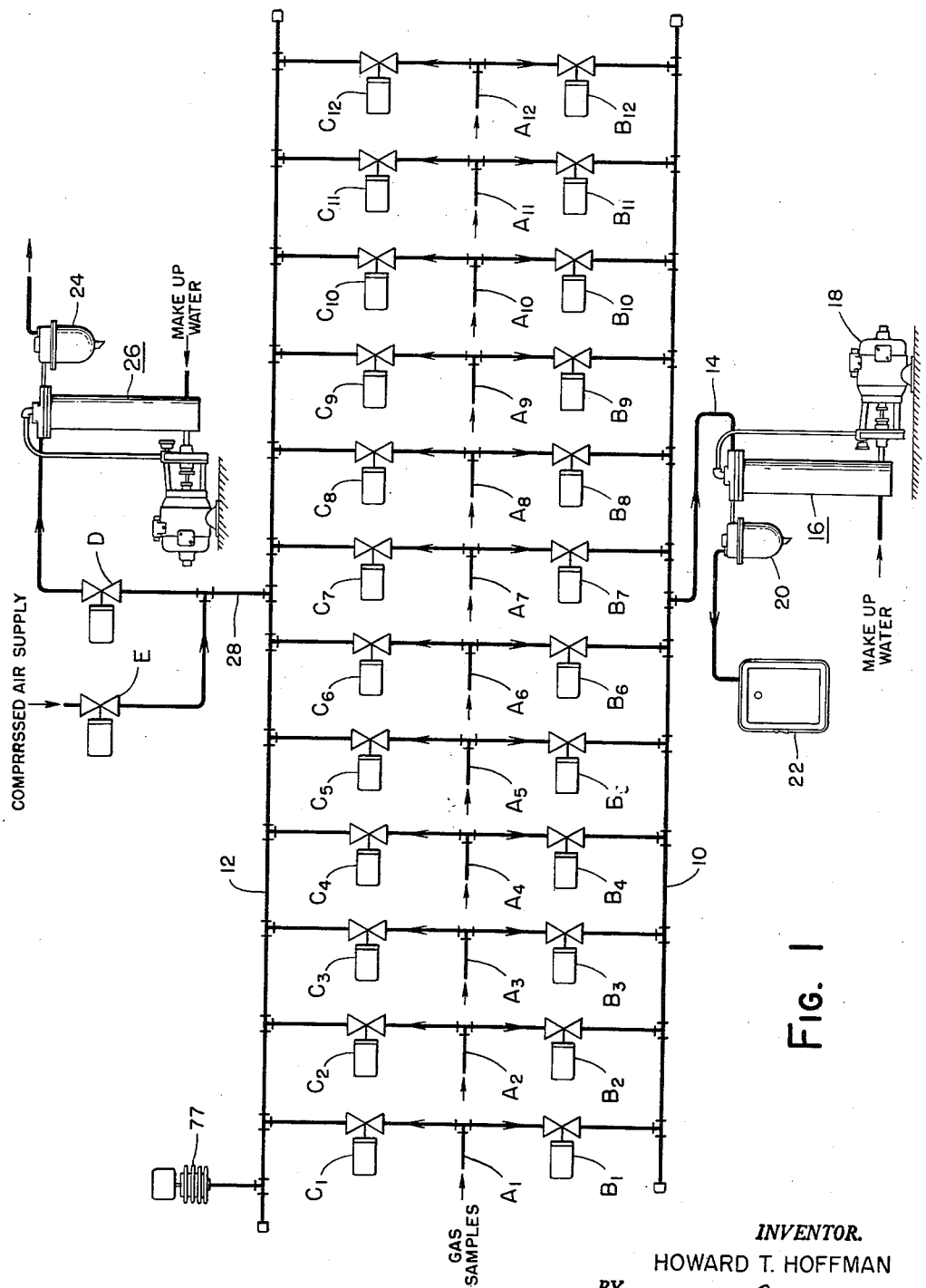

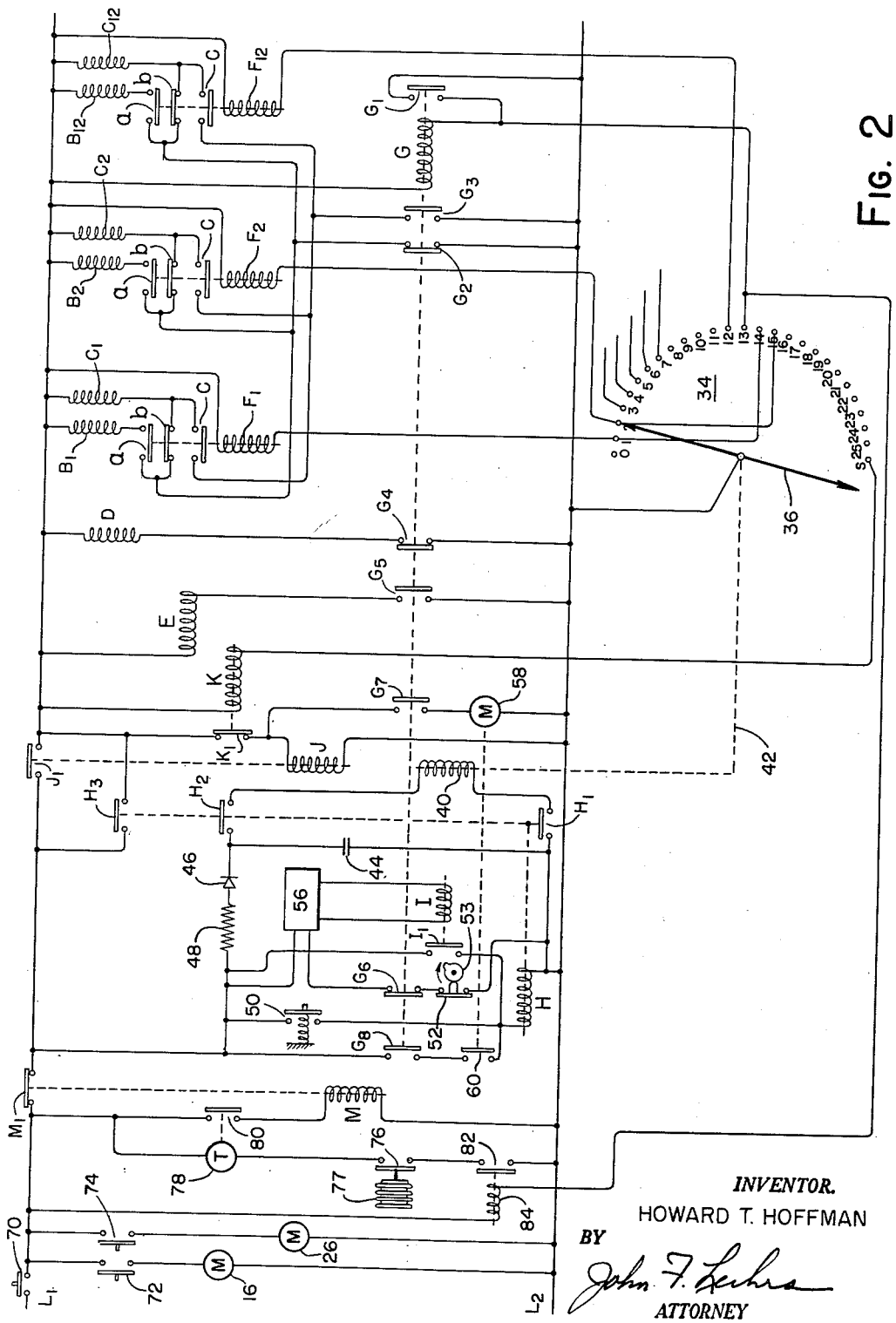

This invention relates to apparatus for automatically scanning a plurality of variables and more particularly to a gas sampling and analyzing apparatus adapted to sequentially sample and analyze the gas at a plurality of sampling points.

In modern power plants it is desired to periodically analyze the products of combustion to determine the efficiency of the combustion process. Due to the complex nature and large size of modern steam generators it is usually desirable and we may say necessary to make gas analyses at a large number of points distributed in preselected configuration across a duct or pass of the generator.

In the past it has been customary to manually obtain gas samples at the various sampling points and then to analyze the samples with a conventional analyzing apparatus. While this type of sampling and analyzing produces a highly accurate analysis of the gas at each sampling point, it is unsatisfactory due to the time consumed in manually scanning the various sampling points. For example, if the combustion conditions should change during the test or sampling operation, some of the samples will be taken under different conditions and substantially affect the accurate determination of generator efficiency or stratification present.

It is an object of this invention to automatically scan and analyze the gas at a plurality of sampling points to reduce the overall test time to a minimum.

Another object of this invention is to sequentially sample and analyze the oxygen content of flue gas at a plurality of sampling points with a single analyzing apparatus.

Still another object is to provide apparatus which will perform the scanning and sampling entirely automatically and eliminate the necessity for any manual steps at any point in the operation.

It is a further object to provide a self cleaning apparatus which will blow back and purge each sampling line and hence deliver to the analyzing apparatus true samples of the flue gas.

Other objects and advantages will become apparent from the following description taken in connection with the accompanying drawings wherein:

FIG. 1 is a schematic illustration of the piping employed in the gas sampling apparatus embodying this invention, and FIG. 2 is a wiring schematic for the gas sampling and scanning apparatus.

Referring now to FIG. 1 of the drawings, the sampling system comprises a gas sample manifold 10, and a purge and blow back manifold 12. A plurality of sampling lines $A_1$–$A_{12}$ are connected to a plurality of conduits extending between the two manifolds, the sampling lines extending to sampling points not shown. A plurality of solenoid valves $B_1$–$B_{12}$ serve to control communication between the sampling lines $A_1$–$A_{12}$ respectively and the sample manifold 10 while a plurality of solenoid valves $C_1$–$C_{12}$ similarly control communication between the sampling lines and the manifold 12. The solenoid valves are arranged to establish communication between their associated sampling line and manifold when energized and to prevent communication when deenergized.

As will later be described in more detail, the solenoid valves $B_1$–$B_{12}$ are sequentially energized on a time basis to sequentially place the sampling lines $A_1$–$A_{12}$ in communication with the sample manifold 10. The sample is drawn through the sampling line in communication with manifold 10 and a pipe 14 by means of a continuously operating washer pump unit 16. After washing, the unit 16 discharges the sample into a separator trap 20 and thence to a gas analyzer 22.

The washer pump unit 16, trap 20, and analyzer 22 may be of any suitable type. In one well known construction, wash water is circulated from a water reservoir in the lower portion of the unit 16 by a pump 18 of the centrifugal type and which forces the water through an aspirator in the upper portion of the unit. The gas sample is drawn in and washed by the jet of water formed in the aspirator. Dirt particles are wetted and drained off in the separator trap 20, and a clean sample is supplied the analyzer 22. The analyzer may take the form of that disclosed in McEvoy Patent No. 2,821,462.

A washer pump unit 26 and separator trap 24 of construction similar to that of the unit 16 and trap 20 are arranged to withdraw gas from the purge and blowback manifold 12 through a conduit 28 and a solenoid valve D, when the valve D is energized or in an open position. In this case, the gas from the washer is not analyzed but merely blown to waste.

A source of compressed air is connected through a solenoid valve E to the conduit 28 between the solenoid valve D and purge and blowback manifold 12. When the valve E is open valve D is closed and the source will be connected directly to the manifold 12 and blow back any sampling line in which a $C_1$–$C_{12}$ valve is open.

In operation of the apparatus thus far described, the valves $C_1$–$C_{12}$ are open and the valves $B_1$–$B_{12}$ are closed prior to the commencement of a gas analyzing cycle. In addition, the valve E is closed and valve D open to permit the unit 26 to withdraw gas from the manifold 12 to thus continuously purge the sample lines $A_1$–$A_{12}$. A scanning switch later to be described is effective in conjunction with a control circuit to sequentially open and close each of the valves $B_1$–$B_{12}$ to connect each of the sampling lines $A_1$–$A_{12}$ in turn to the sample manifold 10 and thus to the analyzer 22. The valves $C_1$–$C_{12}$ are sequentially closed during this sampling operation, the control circuit being effective to cause the valve C to close for each sampling line during the time the associated valve B is open. Thus, when the scanning operation is commenced, valve $B_1$ will be opened and valve $C_1$ will be simultaneously closed, and the gas in sampling line $A_1$ will be drawn into the manifold 10 and through the analyzer 22 by the unit 16. After a predetermined increment of time the control circuit will close valve $B_1$, open valve $B_2$, open valve $C_1$ and close valve $C_2$. Thus sampling line $A_2$ will be connected to the sample manifold 10.

Since all the valves $C_1$–$C_{12}$ are open with the exception of the valve associated with the sample line connected to the manifold 10, the gas in the sampling lines which are not at the moment connected to the manifold 10 will be withdrawn by unit 26 and washer 24 and wasted. This arrangement serves to continuously purge the lines not being sampled to thereby continuously maintain samples in the lines representative of the flue gas currently in the duct or generator pass.

After the 12 sampling lines have been scanned in the above manner, the valves $B_1$–$B_{12}$ closed, the control circuit is effective to close valves $C_1$–$C_{12}$, close valve D, and open valve E, shutting off the unit 26 from manifold 12 and connecting the source of compressed air thereto. Following this, the valves $C_1$–$C_{12}$ are sequentially opened each for a predetermined increment of time with the valves $B_1$–$B_{12}$ remaining closed to blow back each of the sampling lines $A_1$–$A_{12}$ in turn. When the last sampling line has been purged valves $C_1$–$C_{12}$ are all opened, valve E closed and valve D opened. After sufficient time has elapsed to purge sampling lines $A_1$–$A_{12}$ the system is in condition for another analyzing cycle.

Referring now to FIG. 2, the circuitry for accomplishing the above described operation is illustrated generally by a combination operational schematic and across the line wiring diagram. A scanning or step switch 34 having a movable wiper arm 36 is adapted to sequentially engage a plurality of contacts (in this instance 25). The contacts 1–12 are connected to a plurality of relay coils $F_1$–$F_{12}$ respectively which are effective to control energization of the solenoid coils of the valves $B_1$–$B_{12}$ and valves $C_1$–$C_{12}$. For sake of clarity, the solenoid coils for the valves are illustrated in FIG. 2 and given like reference letters.

The relay coils $F_1$–$F_{12}$ are connected between one side of the source and the contacts 1–12 respectively of the scanning switch 34. The wiper arm 36 is connected to the other side of the source and thus serves to sequentially connect the relay coils $F_1$–$F_{12}$ across the source as it steps from its zero position to contact 12. Contacts 14–25 are electrically connected to contacts 1–12 and thus the relay coils $F_1$–$F_{12}$ will also be sequentially energized as the wiper arm is stepped through contacts 14–25. The purpose of scanning or energizing the relay coils $F_1$–$F_{12}$ twice in one cycle of the wiper arm 36 is to establish the analyzing operation when the contact arm steps through contacts 1–12 and the blowback operation when the wiper arm steps through contacts 14–25. The circuitry of the solenoid coils $B_1$–$B_{12}$ and $C_1$–$C_{12}$ is modified while the contact arm is stepping through contacts 14–25 to accomplish the blowback operation.

Each of the relay coils $F_1$–$F_{12}$ is provided with three switches which are distinguished by the letters (a), (b), and (c). Each assembly of switches is biased to the position illustrated in FIG. 2 assumed during deenergization of its associated relay coil. Taking relay coil $F_1$ for example, switch (a) controls energization of the solenoid valve B, switch (b) controls energization of valve $C_1$ and switch (c) controls energization of a second shunt circuit for the valve $C_1$.

The energizing effect of the various switches (a), (b), and (c) on the valves $B_1$–$B_{12}$ and $C_1$–$C_{12}$ upon energization of the relay coils $F_1$–$F_{12}$ is determined by a relay coil G which actuates a plurality of switches $G_1$–$G_6$ biased to the positions illustrated in FIG. 2 when relay coil G is deenergized. This relay coil is connected to contact 13 of the stepping switch and thus is deenergized during the scanning of contacts 1–12 but becomes energized when the wiper arm 36 engages contact 13. Upon energization, the relay coil G will remain energized through the scanning of contacts 14–25 due to the provision of a switch $G_1$ which closes to establish a holding circuit directly across the source.

Referring now to switches $G_2$ and $G_3$ it is to be noted that switch $G_2$ which is closed during deenergization of relay coil G permits energization of parallel circuits containing the solenoid coils $B_1$–$B_{12}$, $C_1$–$C_{12}$ and associated switches (a) and (b). On the other hand, switch $G_3$ which is open during deenergization of relay coil G serves to permit energization of the shunt circuits for solenoid valves $C_1$–$C_{12}$ by associated switches (c). Thus, when relay coil G is deenergized during the scanning of the first 12 contacts, the switches (a) and (b) of the relay coils $F_1$–$F_{12}$ are effective to control energization of the valves $B_1$–$B_{12}$ and valves $C_1$–$C_{12}$ respectively since switch $G_2$ is closed. But since switch $G_3$ is open, the switches (c) are ineffective to control energization of the shunt circuits for the valves $C_1$–$C_{12}$. When the relay coil G is energized during the scanning of contacts 14–25, the switches (a) and (b) are ineffective to control energization of the valves $B_1$–$B_{12}$ and valves $C_1$–$C_{12}$ while the switches (c) are effective to control energization of the valves $C_1$–$C_{12}$ through the shunt circuits.

Whenever the relay coils $F_1$–$F_{12}$ are deenergized during the scanning of contacts 1–12 it is thus apparent that the purge and blowback valves $C_1$–$C_{12}$ will be open as a result of switches (b) being closed and sample valves $B_1$–$B_{12}$ will be closed since switches (a) are open. However, as each of the relay coils $F_1$–$F_{12}$ is energized during the scanning of contacts 1–12 each of the valves $C_1$–$C_{12}$ will close and the corresponding valves $B_1$–$B_{12}$ will open permitting a sample of gas to be supplied to the analyzer as previously described.

The opening and closing of the B and C valves for each sampling line will occur sequentially until the wiper arm reaches contact 13 whereupon the relay coil G will be energized and remain energized during the scanning of the contacts 14–25 by the wiper arm 36. During this time switch $G_3$ will be closed, switch $G_2$ will be open, and the valves $B_1$–$B_{12}$ and valves $C_1$–$C_{12}$ will be closed during deenergization of the relay coils $F_1$–$F_{12}$. However, energization of these relay coils during scanning of contacts 14–25 is effective to energize the solenoid coils of the valves $C_1$–$C_{12}$ through the shunt circuits established by switches (c). Thus the valves $C_1$–$C_{12}$ are sequentially opened and closed as the wiper arm is stepped from contact 14 through contact 25.

As previously mentioned, the solenoid valves D and E are open and closed respectively during the sampling operation but in their opposite positions during blowback operation. To accomplish this switches $G_4$ and $G_5$ are connected in series with the solenoid coils for these valves. Thus, the valve E is actuated to an open position and valve D is actuated to a closed position when the wiper arm engages contact 13.

Referring now to the circuitry for controlling operation of the stepping switch 34, for each signal pulse applied, a solenoid coil 40, provided with a linkage 42 is adapted to advance the contact arm 36 one contact position. A capacitor 44 is connected in parallel with the coil 40 across the source in series with a rectifier 46 and a resistance 48. A relay coil H is connected in series with a manually operable pushbutton switch 50 in a second parallel circuit with the step switch coil 40. The relay coil H is provided with a pair of switches $H_1$, $H_2$, connected in series with the coil 40 on opposite sides thereof and a third switch $H_3$ the function of which will later be described.

At the end of the cycle of operation of the apparatus, wiper arm 36 is at rest on contact S. When the button 50 is depressed by the operator, relay coil H will be energized, switches $H_1$, $H_2$ will close, and the capacitor 44 will discharge through the step switch coil 40 thus applying a momentary D.-C. pulse to the coil 40 to advance the wiper arm to No. 1 contact position. The resistance 48 limits the flow of current through the coil 40 to a safe value after discharge of the capacitor 44.

A separate parallel energizing circuit is then established for the relay coil H through switch $G_6$ and a switch 52 which is closed except when held in the open position by a cam 53 while wiper arm 36 engages the contact S. As the relay coil G is deenergized when the wiper arm engages contact S and switch $G_6$ is closed, switch 52 serves to hold the stepping switch in the S or start position until manual operation of switch 50. Thereafter the stepping switch will automatically advance through the sampling and blowback cycle until wiper arm 36 again engages contact S where it will remain until switch 50 is again manually operated.

The cam 53 may be rotated in synchronism with the wiper arm 36 by any suitable mechanism (not shown) or connected to the wiper arm 36 for operation thereby.

From contact No. 1 through contact 12, the stepping of the wiper arm 36 is controlled by a control and timing device 56 which is operative to periodically energize a relay coil I having a switch $I_1$ shunting the switch 50. The device 56 which does not form a part of my invention may comprise a suitable timing circuit (not shown)

for periodically energizing the relay coil I to thus periodically close the switch $I_1$ and energize the relay coil H to apply a pulse of the stepping coil 40.

It has been found that approximately one minute is required for the analyzer 20 to stabilize on a gas sample and manifest the analysis; therefore, the device 56 is preferably adapted to apply a pulse to the relay coil I approximately every minute until the wiper arm reaches contact 13.

While approximately one minute is required for the analyzer to stabilize on a gas sample during the sampling portion of the cycle, only a very short time is required to blow back each sampling line $A_1$–$A_{12}$ during the blowback portion of the cycle. For this reason separate means is provided for energizing the relay coil H during the scanning of contacts 11–25. More particularly, a synchronous motor 58 is connected in series with the switch $G_7$ and provided with a suitable cam (not shown) arranged to periodically and momentarily close a switch 60 connected in series with the switch $G_8$ in a circuit shunting the switch I. When the wiper arm 36 engages contact 13 the switch $G_6$ will open and switches $G_7$, $G_8$ will close. Opening of switch $G_6$ breaks the circuit including switch 52 and device 56 while switch $G_7$ energizes the motor 58 and switch $G_8$ completes the parallel circuit through switch 60. Thus, the motor 58 will rotate and periodically actuate the switch 60 to energize the relay coil H and apply a pulse to the stepping coil 40. Since only a very short time is required for each sampling line to be blown down, the motor 58 and switch 60 can be arranged to effect rapid scanning of the contacts 13–25 by the wiper arm 36.

Referring now to the remainder of the circuitry illustrated in FIG. 2, a switch 70 is arranged to supply power to the entire circuit. The motors of the units 16, 26 are connected across the source upon closure of switches 72, 74 respectively. A relay coil J having a switch $J_1$ is connected across the line wires and is adapted to be energized by switch $H_3$ which closes upon energization of relay coil H when the operator momentarily closes switch 50. When the switch 50 is released by the operator, the relay coil J will remain energized through the provision of a holding circuit established by switch $J_1$ which closes upon energization of relay coil J. The switch $J_1$ is also effective to energize the circuitry to the right thereof as viewed in FIG. 2.

The relay coil J is deenergized when the wiper arm reaches contact S through the provision of a relay coil K which is connected between the contact S and one side of the source and which is provided with a normally closed switch $K_1$ connected in series with relay coil J. Thus, when the wiper arm reaches contact S relay coil K will be energized to open switch $K_1$ and break the holding circuit for relay coil J established by switch $J_1$. Accordingly, switch $J_1$ will open and the circuit to the right of switch $J_1$ on the drawing including relay coil G will be deenergized until the switch 50 is again actuated to initiate a cycle of operation of the system.

As a safety feature, a switch 76 responsive to the pressure in manifold 12 as sensed by a bellows 77 is effective to close and energize a timer 78 provided with a normally open switch 80 connected in series with a solenoid coil M. The coil M operates a normally closed switch $M_1$ which is effective to control energization of the entire circuit to the right thereof. When an extremely high pressure condition is encountered the switch 76 will close, energizing the timer 78. After a predetermined time, indicating that the sampling line then connected to the manifold 12 is plugged beyond the capabilities of the compressed air to open, timer 78 will close switch 80 to energize coil M and thereby open switch $M_1$ shutting off the power to the system.

The time delay provided by timer 78 prevents the system from being shut down in response to only temporary build-up of pressures while debris is being blown back by the compressed air. Preferably solenoid M is of the manual reset type so that once switch $M_1$ opens it will remain open until manually reset to the closed position. To prevent opening of switch $M_1$ while wiper arm engages contact 13 (the C valves being closed valve D closed and valve E open) a switch 82 is provided operated to an open position by a solenoid 84 when energized.

*Operation*

To sum up the operation of the entire system, the main line switch 70 is first closed to supply power to the circuit, and switches 72, 74 are closed to energize the pumps of units 16, 26.

With wiper arm 36 in the S position to initiate a scanning operation, the pushbutton switch 50 is momentarily depressed energizing relay coil H which closes switch $H_3$ to energize relay coil J and establish the holding circuit through switch $J_1$. Energization of relay coil H also closes switches $H_1$, $H_2$ and permits the capacitor 44 to discharge through the step switch coil 40 which advances the wiper arm 36 from contact S to No. 1 position. Switch 52 closes and energizes timing device 56. Periodically thereafter coil I is energized momentarily closing contact $I_1$ to complete a parallel cicuit for relay coil H to again close switches $H_1$, $H_2$ and discharge the capacitor 44 through the step switch coil 40. Thus, the wiper arm 36 will be advanced periodically from contact 1 through contact 12.

When the wiper arm engages contact 1 of the stepping switch 34, relay coil $F_1$ will be energized and its switch (a) will close to open the valve $B_1$ and simultaneously switch (b) will open closing the valve $C_1$. Thus, gas from sample line $A_1$ will be drawn through the manifold 10, unit 16, separator trap 20 and into the analyzer 22.

The control and timing circuit 56 will become operative after approximately one minute has elapsed to advance the wiper arm 36 to contact No. 2 deenergizing the relay coil $F_1$ and energizing the relay coil $F_2$. Thus, valve $B_2$ will open and valve $C_2$ will close permitting gas to be drawn from sample line $A_2$ for analysis in the analyzer 22. This operation will continue for relay coils $F_3$–$F_{12}$. During the scanning of contacts 1–12, the timing and control circuit 56 is effective to establish a one minute period for the analysis of the gas drawn from each sample line thus affording adequate time for the analyzer 22 to stabilize.

When the wiper arm 36 engages contact 13, the relay coil G will be energized and remain energized by the holding circuit established by switch $G_1$ until wiper arm 36 engages contact S. Energization of relay coil G is effective to open switch $G_6$ to deenergize control device 56 and to close switches $G_8$ and $G_7$ to place energization of relay coil H under the control of motor 58 and switch 60. In addition, energization of relay coil G is effective to close switch $G_3$ and open switch $G_2$ to modify the circuitry associated with valves $B_1$–$B_{12}$ and valves $C_1$–$C_{12}$ in the manner hereinbefore described. In addition, energization of relay coil G is effective to open switch $G_4$ and close switch $G_5$ to deenergize relay valve D and energize the valve E respectively to thereby connect the compressed air supply to the manifold 12.

With the circuit thus conditioned, the motor 58 and switch 60 will periodically energize the relay coil H causing the wiper arm 36 to step from contact 13 to contact S. Relay coils $F_1$–$F_{12}$ will be sequentially energized as the wiper arm 36 is stepped, but due to the modification of the circuitry associated with valves $B_1$–$B_{12}$—$C_1$–$C_{12}$ the valves $B_1$–$B_{12}$ will not be opened. However, the valves $C_1$–$C_{12}$ will be sequentially opened to blow back each of the sampling lines $A_1$–$A_{12}$.

When the wiper arm 36 engages contact S, the relay coil K will be energized to open the switch $K_1$ and break the holding circuit for relay coil J thus shutting down the system.

It will thus be apparent that the sampling apparatus is capable of automatically scanning a plurality of sample lines so that an accurate analysis of the sample in each line may be obtained. In addition, the apparatus will automatically blow back each sampling line following the scanning operation at a much faster rate to speed up the entire cycle of operation. Since the scanning rate during the analyzing portion of the cycle is time controlled, adequate time is insured for the analyzer to stabilize on each gas sample.

It is to be noted that the relay coil I and device 56 are used only during the scanning of the sampling points for gas analysis. Except for this period of time therefore the device 56 is released for the control of other scanning operations, as for example, control of the scanning system disclosed and claimed in my copending application Serial No. 741,186 filed concurrently herewith.

While only one embodiment of the invention has been shown and described, it will be apparent to those skilled in the art that many changes may be made in the construction and arrangement of parts without departing from the scope of the invention as defined in the appended claims.

What I claim as new and desire to secure by Letters Patent of the United States is:

1. A gas sampling apparatus comprising a plurality of sampling lines for sampling gas at a plurality of locations respectively, a gas sample manifold, a gas analyzing means connected to said sample manifold for analyzing the gas therein, first electrically operable valves associated with said sampling lines respectively operative when energized to connect said sampling lines to said sample manifold, a second manifold, second electrically operative valves associated with said sample lines respectively operative when energized to connect said sample lines to said second manifold, a blowback valve operative when energized to connect said second manifold to a source of air under pressure, a purge valve operative when energized to connect said second manifold to a pump to continuously withdraw gas from said sample lines when said second valves are energized, first circuit means including a plurality of first relay coils each having switch means for controlling energization of said first and second valves, said first circuit means being arranged to effect energization of said second valves and deenergization of said first valves when said relay coils are deenergized, a scanning switch operative in a first scanning range to sequentially energize said relay coils to energize said first valves and deenergize said second valves and operative in a second scanning range to sequentially energize said relay coils, second circuit means including a second relay coil and second switch means for energizing said purge valve and deenergizing said blowback valve during operation of said switch in said first range and for deenergizing said purge valve and energizing said blowback valve during operation of said scanning switch in said second range, said second switch means being effective to modify said first circuit means to effect deenergization of both said first and second valves during deenergization of said first relay coils and only energization of said second valves during energization of said first relay coils in operation of said scanning switch in said second range.

2. A gas sampling apparatus, comprising a plurality of sampling lines for sampling gas at a plurality of locations, a single analyzing device for analyzing the gas samples, first electrically operative valves associated with said sampling lines respectively for connecting the same to said analyzing device upon energization thereof, a manifold, second electrically operative valves associated with said sampling lines respectively for connecting the same to said manifold upon energization thereof, an electrically operative purge valve effective when energized to connect said manifold to waste through a pump, an electrically operative blow down valve effective when energized to connect said manifold to a source of compressed air, a scanning switch operative through a first range of positions and through a second range of positions, first circuit means for normally effecting deenergizing of said first valves and said blow down valve and energization of said second valves and said purge valve in said first range of positions of said scanning switch, said scanning switch being effective during operation in said first range of positions to sequentially and momentarily energize said first valve and deenergize said second valve associated with each of said sampling lines to sequentially supply samples from said lines to said analyzing device, and second circuit means for normally effecting deenergization of said first and second valves and said purge valve and energization of said blow-down valve during operation of said scanning switch in said second range of positions, said scanning switch being operative in said second range of positions to sequentially and momentarily energize said second valves to effect blowdown of said sampling lines.

3. A gas sampling apparatus comprising, a plurality of sampling lines for sampling gas at a plurality of locations, a gas analyzing device, first electrically operative valve means associated with said sampling lines respectively for connecting the same to said analyzing device upon energization thereof, second electrically operative valve means associated with each of said sampling lines respectively for connecting the same to a source of air under pressure, and a scanning device operative through a first range of positions at a predetermined rate for sequentially and momentarily energizing said first valves to sequentially connect said sampling lines to said analyzing device at said predetermined rate and operative through a second range of positions at a different rate for sequentially and momentarily energizing said second valves following the sequential energization of said first valves to sequentially blow down each of said sampling lines at said different rate.

4. A gas sampling apparatus as claimed in claim 3 wherein said scanning device comprises a scanning switch, and a stepping coil is connected to said scanning switch by a linkage for actuating the same through said first and second ranges.

5. A gas sampling apparatus as claimed in claim 4 wherein means are provided for periodically energizing said stepping coil in said first range of positions of said stepping switch at said predetermined rate, and second means are provided for periodically energizing said stepping coil at said different rate in said second range of positions.

6. A gas sampling apparatus comprising, a plurality of sampling lines for sampling gas at a plurality of locations, a single analyzing device for analyzing the gas samples, first electrically operative valves associated with said sampling lines respectively for connecting the same to said analyzing device upon energization thereof, a manifold, second electrically operative valves associated with said sampling lines respectively for connecting the same to said manifold upon energization thereof, a blow down valve operative when energized to connect said manifold to a source of air under pressure, a purge valve operative when energized to connect said manifold to a pump to continuously withdraw gas from said sample lines when said second valves are energized, circuit means for initially establishing a first circuit condition effecting deenergization of said first valves, energization of said second valves, energization of said purge valve and deenergization of said blow down valve to establish a continuous purge of said sampling lines, means operative during said first circuit condition to sequentially and momentarily energize said first valves and simultaneously deenergize said second valves thereby sequentially and momentarily interrupting said continuous purge of said sampling lines to effect sequential withdrawal of samples from said sampling lines for analyzation in said analyzing device, means operative at the end of sampling operation of the last said means to establish a second circuit condition effecting deenergization of said first valves, deenergization of said second valves, deenergization of said purge valve and energization of said blow down valve, and means operative during said second circuit condition to sequentially and momentarily energize said second valves to effect sequential blow down of said sampling lines.

References Cited in the file of this patent

UNITED STATES PATENTS

| | | |
|---|---|---|
| 1,809,325 | Austin et al. | June 9, 1931 |
| 2,721,578 | Pouppirt | Oct. 25, 1955 |
| 2,736,201 | Ohlsen et al. | Feb. 28, 1956 |